Jan. 13, 1925.

H. HAUSRATH ET AL

METHOD OF MAKING THIN FOILS OF BASE METAL

Filed Aug. 19, 1922

1,522,625

Inventors:
Herbert Hausrath
Ernst Schlumberger

Patented Jan. 13, 1925.

1,522,625

UNITED STATES PATENT OFFICE.

HERBERT HAUSRATH, OF DURLACH, NEAR KARLSRHUE, AND ERNST SCHLUMBERGER, OF BERLIN, GERMANY, ASSIGNORS TO THE FIRM SCHOTT & GEN., OF JENA, GERMANY.

METHOD OF MAKING THIN FOILS OF BASE METAL.

Application filed August 19, 1922. Serial No. 583,021.

*To all whom it may concern:*

Be it known that we, HERBERT HAUSRATH, a citizen of the German Empire, and residing at Durlach, near Karlsruhe, Germany, and ERNST SCHLUMBERGER, a citizen of the German Empire, and residing at Berlin, Germany, have invented a new and useful Method of Making Thin Foils of Base Metal (for which we have filed an application in Germany, February 26, 1917), of which the following is a specification.

The subject of the present invention is in the first instance a method of making thin foils of base metals. It is intended to provide by this method a constructional element, for example a thin iron foil or a thin foil of constantan, adapted for the manufacture of electric resistances, which are to possess the largest possible resistance in a given space, or which method is, amongst others adapted for making thermo-couples and thermo-piles having a small thermic inertia. According to the invention these foils are made in such a way that the base foilmetal, called hereinafter the useful metal, is plated in the shape of plates by welding and rolling it with a plate of some protecting metal, whereupon the layer of protecting metal is removed in a chemical or electrochemical way. Strange to say it has been proved that the manufacture of thin foils, the layer of which should possess a thickness of a few thousandths of millimetres, is feasible, even in large pieces without the loss of the continuity of the layer of useful metal by removing the protecting metal from this layer.

By a suitable selection of the protecting metal it is possible to carry out the separation of the latter metal from the useful metal in the desired way by the known chemical or electrochemical methods. One may, for example select as a protecting metal such a metal which with a solvent, for instance ammonia or cyanide of alkali furnishes soluble complex salts in which case the useful metal must be such as not to cause any or only a practically insignificant reaction upon the respective solvent. Under this class come as protecting metals, such metals as copper, zinc, magnesium, silver and brass, whilst as useful metals, such metals as iron, steel, manganese and constantan may be used. The electrochemical method in which the protecting metal is anodically dissolved in a suitable electrolyte and under appropriate conditions of current, may, for instance, be used to advantage for removing a layer of brass from iron or constantan, whereby as an electrolyte serves pure caustic alkali, especially one free from halogen, or carbonate of alkali with an addition of caustic alkali.

The method according to the invention is, of course, not restricted to the manufacture of plane foils but may, for example be also applied to the manufacture of wires and pipes in which case the rolling is replaced by drawing, if necessary.

When using the method according to the invention for the manufacture of the finest foil, owing to the requisite extensive rolling there arise sometimes difficulties inasmuch as impurities and inequalities of the material are stretched out in the direction of rolling in such a way as to assume the shape of lines by which the foil can be weakened or even completely scratched through. In order to obviate this drawback, which for example arises particularly easily with Swedish iron, as well as damages to the useful metal through superficial soilures and oxidation during the mechanical treatment, it is some times preferable to have the useful metal plated on either side with protecting metal.

For certain purposes of using a foil made according to the invention it is furthermore suitable to employ as a plate of useful metal a plate consisting of two different metals which are connected to each other along a line, by being welded together. In this way foils are obtainable from which it is possible to obtain band-shaped thermo-couples, by dividing these foils transversely to the aforesaid line as well as according to the method described in the patent specification 1232062 which, however, have the advantage of greater fineness and thus of smaller thermic inertia over those thermo-couples cut from the sheets, made according to the Patent 1232062. As useful metals, such metals as iron and constantan may be used for this purpose. Instead of pure iron especially alloys of iron or steel on the one hand and nickel on the other hand have proved useful because these metals oxidize less easily than iron and may be rolled to a smaller thickness without being spoiled by pores. In the event of the percentage of nickel not being too high, the thermo-power of these alloys is but little smaller than that of pure iron. Besides, these alloys have the advantage of a higher specific resistance.

The subdivision of such thin foils as mentioned in this case, such as their division into a larger number of narrow bands, presents certain difficulties owing to the great sensitiveness of the foils. Hence, in order to make, for example a grating which consists of a meander-shaped trip, it is suitable to subdivide after the rolling the sheets still consisting of the foil and the protecting metal at least partly to such a depth as would still leave a coherent plate of the protecting metal. Hereupon, preferably after the grating has been fixed on its definite carrier, the protecting metal is removed. In the case of a double sheet, consisting of the foil and a single layer of protecting metal, it is possible to bring about such a subdivision by engraving corresponding lines with the tool, the sand blast apparatus or by means of etching from the foil-side. If the foil be plated with protecting metal on either side, it is, of course, necessary to divide the layer of protecting metal on the one side of the foil and the foil itself through the whole thickness of the layer. As a rule, the subdivision will in either case be carried out in such a way as would leave a complete, uninterrupted plate of protecting metal. This is always possible if the foil is to be fixed unilaterally on a supporting surface. If, however, it is to be fixed between two supporting surfaces embracing the foil, and if, in addition, the body which remains after the removal of the protecting metal is to obtain the shape traced by the subdivision, it is also necessary to divide in those parts of the sheet metal which will lie between the supporting surfaces, the protecting metal through its whole thickness because on removing the protecting metal, those parts of it which lie between the supporting surfaces would be allowed to remain. The new method of subdividing thin foils may, of course, also be combined to advantage with the so-called Wollaston method of making platinum foils or be applied in such cases in which the useful metal is not connected to the protecting metal by plating but applied to same, for example by means of squirting, cathodal spraying or the like.

The foils made according to the present invention can be used to advantage for manufacturing a number of electric apparatus and parts thereof, in which case it is often suitable to combine the method of making the foils with that of making the respective parts of apparatus. If, for instance, stiffenings are to be provided on the foils, possibly for the purpose of freely stretching out the foils to a greater length, these stiffenings are suitably obtained by not removing the protecting metal at the places to be stiffened.

As the foils can easily be made of constantan or some other material of comparatively high resistance, they can also be used to advantage for the manufacture of electric resistances. If for example it be desirable to make a resistance of a certain amount, the adjustment of the resistance is suitably combined with the removal of the protecting metal by only removing the latter until the desired resistance has been attained, either by only removing the protecting metal on a certain length of the resistance-band, or by only removing it up to a certain definite part of its thickness. In the event of a surfacelike foil resistance it is at times advisable, in order to reduce the resistance, to allow suitably shaped strips of protecting metal to remain between the points of connection.

The annexed drawing shows a constructional example of the invention.

Figure 1:
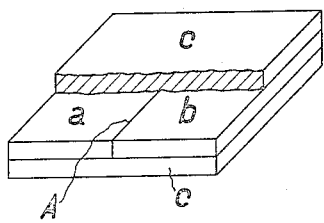
Fig. 1 is a perspective view of a plate, consisting of a layer of useful metal and two layers of protecting metal, the top layer of protecting metal being partly broken off.
Figure 2:
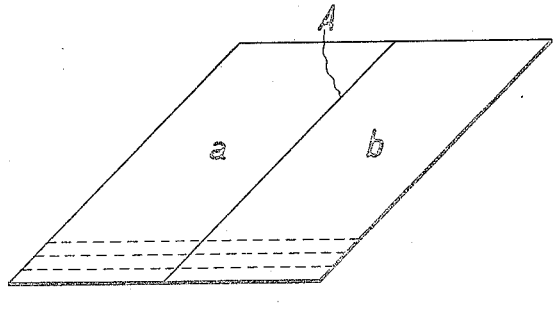
Fig. 2 is a perspective view of a finshed foil.

Fig. 1 and 2 illustrate the manufacture of a foil consisting of two different metals and destined to serve as starting material for thermo-couples. The useful metal is thus composed of two components $a$ and $b$ which are welded together along a straight line A. As may be seen from Fig. 1, the useful metal consists of a comparatively thick plate. On either side of the latter there are welded plates of protecting metal $c$. The block thus formed has then been rolled in the direction of the straight line A and hereupon the protecting metal $c$ entirely been removed so as to leave the foil shown in Fig. 2. By dividing the foil along the dotted lines it is possible to obtain from this foil single band-shaped thermo-couples of very small thickness.

Figure 3:
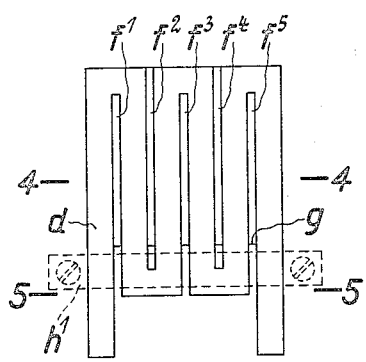
Fig. 3 is a view of a meander-shaped subdivided foil which is still provided with the protecting metal.
Figure 4:
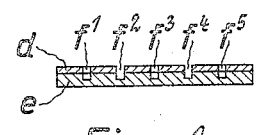
Fig. 4 is a cross-section on the line 4—4 of Fig. 3.
Figure 5:
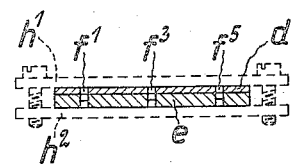
Fig. 5 is a cross section on the line 5—5 of Fig. 3.

Figs. 3 and 5 show the manufacture of a meander-shaped resistance-band of a foil $d$ which has been rolled together with a protecting metal *e*. In order to attain a meander-shaped foil, slots $f^1$, to $f^5$ have been worked out of the foil by means of the sand blast apparatus. From the ends shown at the top in the annexed drawing up to the points *g* these strips are separated up to the depth shown in Fig. 4 so as to leave a coherent plate of protecting metal. Prior to the removal of the latter metal the sheet metal has been clamped between two bars $h^1$ and $h^2$ of insulating material. These bars are simultaneously destined to serve later on as a carrier of the foil if the latter is to be fitted into a casing, for example in order to form a component of an actinometer. With a view to avoid that, when removing the protecting metal, parts of the latter be left between the two bars $h^1$ and $h^2$, the protecting metal has been entirely removed (vide Fig. 5) with the aid of the sand blast apparatus from the points *g* up to the lower ends of the slots $f^1$, to $f^5$.

Figure 6:
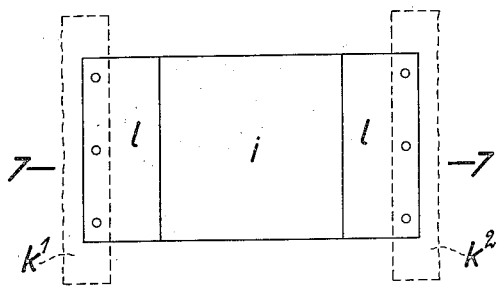
Fig. 6 is a view of a resistance-element upon which strips of protecting metal have been allowed to remain.
Figure 7:
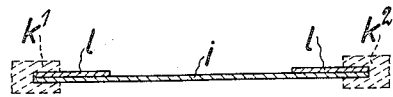
Fig. 7 is a cross section on the line 7—7 of Fig. 6.

The resistance-element *i* shown in Fig. 6 is fixed with its ends in two bars $k^1$ and $k^2$ respectively, which are destined to fix the foil in a stretched state to any apparatus whatever. In order to attain with a given breadth of the element and with a given thickness of the foil a certain, definite resistance between the two bars, which is smaller than the resistance of the part of the foil between these bars alone, at the two ends of the foil *i* a strip *l* each of the protecting metal has been left, these two strips serving simultaneously for stiffening the resistance-element.

We claim:

1. Method of making thin foils of base metal, consisting in plating a plate of base metal by welding it with a plate of some other metal, rolling the same and then removing the second named metal by chemical means.

2. Method of making thin foils of base metal, consisting in plating a plate of base metal by welding it with a plate of some other metal, rolling the same and then removing the second named metal by electro-chemical means.

3. Method of making thin foils of base metal, consisting in plating a plate of base metal on either side with a plate of some other metal, rolling the same and then removing the second named metal by chemical means.

4. Method of making thin foils of base metal, consisting in connecting two plates of different base metal to each other along a line, plating these connected plates with a plate of some other metal, rolling these plated plates, and then removing the last named metal by chemical means.

5. Method of producing subdivided thin foils, consisting in plating a plate of metal with a plate of some other metal, rolling the same, subdividing both metals at least partly only to such a depth that a coherent plate of the second named metal is left, fastening the plate on a carrier and then removing the second named metal.

6. Method of making thin foils of base metal, consisting in connecting a layer of base metal with a plate of another metal and removing then the second named metal by chemical means, with the exception of such places where the said foil should be reinforced.

7. Method of making thin foils of base metal, consisting in plating a plate of base metal by welding it with a plate of some other metal, rolling the same and then removing the second named metal by chemical means, with the exception of such places where the foil to be produced should be stiffened.

8. Method of making thin foils of base metal, consisting in plating a plate containing iron by welding it with a plate of some other metal, rolling the same and then removing the second named metal by chemical means.

9. Method of making an electric resistance consisting in connecting a layer of metal with a plate of another metal and then removing the second named metal by chemical means to such an extent as to impart to the said resistance the desired amount.

HERBERT HAUSRATH.
ERNST SCHLUMBERGER.

Witnesses:
PAUL KRÜGER,
RICHARD HAHN.